United States Patent [19]
Bachmann et al.

[11] 3,814,156

[45] June 4, 1974

[54] THREADED ARTICLES WITH LOCKING OR SEALING COATINGS

[75] Inventors: Andrew Bachmann, Weatogue; Robert E. Batson, Newington, both of Conn.

[73] Assignee: Loctite Corporation, Newington, Conn.

[22] Filed: Sept. 27, 1971

[21] Appl. No.: 184,196

[52] U.S. Cl............ 151/14.5, 117/37 R, 117/132 A, 117/132 B, 117/132 BE, 117/C, 117/CF, 260/29.6 R
[51] Int. Cl.............................................. F16b 39/00
[58] Field of Search ..................... 260/29.6 R, 41 B; 151/14.5; 117/37 R

[56] References Cited
UNITED STATES PATENTS

| | | | |
|---|---|---|---|
| 3,419,512 | 12/1968 | Lees et al. | 260/29.7 |
| 3,485,132 | 12/1969 | Hanny et al. | 85/1 C |
| 3,547,851 | 12/1970 | Frauenglass | 151/14.5 |

FOREIGN PATENTS OR APPLICATIONS

| | | | |
|---|---|---|---|
| 1,149,944 | 4/1969 | Great Britain | 85/1 C |

*Primary Examiner*—Allan Lieberman
*Assistant Examiner*—J. H. Derrington

[57] ABSTRACT

Threaded fastening members are provided which have their threaded surfaces partially or fully coated with a composition containing a microencapsulated liquid adhesive and a torque-tension control agent which brings the torque-tension relationship of the coated threaded member to a minimum of approximately 80 percent of the torque-tension relationship of the threaded member without said coating.

14 Claims, No Drawings

THREADED ARTICLES WITH LOCKING OR SEALING COATINGS

BACKGROUND OF THE INVENTION

This invention concerns threaded fastening members, which term is used broadly to include all screw-threaded objects which can be secured or fastened to a second object having mating screw threads. Both externally and internally threaded members are included. The threaded members may be constructed from essentially any solid formable substance, but the preponderance of such members are metallic. The most common areas of application are those of threaded fasteners and threaded pipe and pipe fittings.

A major problem involved in the use of threaded fastening members of the type described above is that of loosening or relaxation caused by stress or by vibration. A myriad of mechanical locking agents or devices have been commonly used in the past in order to try to alleviate these problems. Typical examples are lockwashers and thread deforming agents. These devices and agents are acceptable in a number of applications, but are still subject to many of the shortcomings of threaded assemblies which do not use them. In addition, these mechanical assemblies are subject to the inherent inability to seal against pressurized liquids and gases, and resort must be to external sealing devices.

Attempts have been made to alleviate these problems by replacing the mechanical agents with chemical sealing or locking agents, which provide surface-to-surface seals or bonds in the mated assemblies. A typical example is shown in U.S. Pat. No. 3,061,455 to Anthony, issued Oct. 30, 1962, which involves the application of each component of a two-component adhesive to distinct portions of a threaded member, so positioned as to promote mixing of the two components during assembly. U.S. Pat. No. 3,179,143 to Schultz et al., issued Apr. 20, 1965, and U.S. Pat. No. 3,489,599 to Krieble, issued Jan. 13, 1970, concern the use of encapsulated adhesives or sealants as coatings for threaded fasteners.

Major problems have been inherent in the use of these chemical coatings which have limited their usefulness and their acceptance by modern industry. A major factor has been the torque-tension properties of the coated fasteners. In assemblies which utilize threaded members, the assembler consciously or unconsciously utilizes a predetermined torque in determining when the threaded assembly is suitably "tightened". This may be a mere question of feel, based on experience to a given assembler, or in more precise applications by the use of a torque wrench to apply a specific calculated torque value.

The torque which is applied to a threaded emmber, however, is important only in that it is a measure of the tension which is applied longitudinally of the thraded area. As a result, the assembler is using the torque applied to a threaded member as a means of measuring the actual tightening force which is applied by the threaded member. When the threads of a standard threaded member are partially or fully filled with a chemical locking or sealing agent, it has been found that frequently major changes in the torque-tension relationship of the threaded member occur. In other words, a given torque will produce a substantially different tension value in the coated threaded member as compared to the uncoated threaded member.

It may be possible that the tension applied for a given torque is greatly increased, and thus the fastener or the threads thereof could become distorted, thus reducing or destroying the utility of the threaded member. In almost all cases, however, the adhesive or sealant materially impedes the tightening operation and, hence, a substantially lower tension value is produced for a given torque value. As a result, insufficient tightening force is applied and the mating parts of the assembly are much more likely to vibrate, leak, abrade, etc. For further elaboration on the torque-tension concept, reference is made to Industrial Fastener Institute Specification No. 101.

The products of this invention are designed to provide coatings for sealing and bonding threaded assemblies, but which are of much greater utility and acceptability because of major advances, including the solution of the above-described torque-tension problem.

THE INVENTION

This invention concerns threaded fastening members having sealing or bonding coatings on at least a portion of the threaded area thereof, said coating comprising a microencapsulated aehesive and a torque-tension control agent, the torque-tension of the fastening member so coated being no more than about 20 percent lower than the torque-tension relationship of the uncoated fastening member. As used herein, "torque-tension relationship" refers to the amount of tension produced in a seated threaded fastening member by the application of a given torque thereto.

In another respect, the invention concerns a threaded fastener having coated on at least a portion of the threaded area thereof, the coating described in the preceding paragraph.

In another aspect of the invention, a process for the preparation of improved threaded members is presented, which involves the preparation of a solvent slurry of a solvent-soluble binding agent, and encapsulated liquid adhesive contained within a solvent-insoluble encapsulating shell, and a torque tension control agent; applying said slurry to at least a portion of the threaded area of a threaded fastening member; and allowing the solvent to evaporate to form a threaded fastening member having a locking coating, but with a torque-tension relationship which is not more than about 20 percent less than the torque-tension relationship of the uncoated threaded fastening member.

DISCUSSION OF THE INVENTION AND ITS PREFERRED EMBODIMENTS

As indicated above, the threaded fastening members within the scope of this invention are any articles containing internal or external screw threads, which threads are used to fasten the article to a second article having mating threads. The most common are threaded fasteners, such as screws, bolts, studs, nuts and any of a large number of specialty fastening devices. Also included are threaded pipe, and various pipe fittings, such as flanges, couplings and valves, tees, elbows, etc. Within this definition are threaded tubing and threaded tube fittings of this same general type. Other threaded fastening members will be apparent to the skilled worker in the art, and are intended to be encompassed within the broad scope of this invention. Because of the extreme benefits which are achievable in the area of threaded fasteners, and because the benefits of this invention solve long-standing fastener problems, coated threaded fasteners constitutes a highly preferred embodiment of this invention.

Materials of construction for the threaded members generally are metals, and most generally steel, aluminum, brass and a large number of ferrous alloys, but essentially any solid material of construction can be employed. For example, plastic pipe is becoming increasingly important in today's construction industry, and the torque control provided by the use of the invention herein offers unique benefits since high torque values can damage plastic pipe. Various plastics are used in other threaded fastening members, as well.

The adhesive which is utilized in preparing the coated members of this invention can be any adhesive adaptable to encapsulation techniques. As used herein, "adhesive" refers broadly to compositions which serve either or both of sealing and bonding functions. In view of the state of development of encapsulation techniques, essentially any adhesive could be used.

Typical examples of patents which disclose encapsulation techniques adaptable to use with adhesives are U.S. Pat. No. 2,800,457 to Green et al., issued July 23, 1957; and U.S. Pat. No. 2,969,330 to Brynko, issued Jan. 24, 1961. Other encapsulation techniques are described in the technical and patent literature, and will be known to the reasonably skilled worker in the art. As a general rule, encapsulated adhesives range in size from about 10 to about 3,000 microns, and any such products can be utilized herein if not so large as to become impractical of application to the threaded member involved. A typical average size for microcapsules, and a preferred embodiment of the invention disclosed herein, is from about 25 to about 750 microns, and the most highly preferred range is from about 50 to about 500 microns in average particle size.

A feature of such microencapsulated products is that the microcapsule shell walls are sufficiently frangible that substantial numbers of the capsules, if coated onto the threaded area of the threaded fastening member, will be ruptured during a normal fastening operation. This will release the adhesive to perform its intended function.

Preferably, the adhesives used herein are adhesives which will harden after release from the capsule during the assembly operation. Such materials can be a separately encapsulated two-part adhesive system. For example, an epoxy resin and an epoxy hardener can be separately encapsulated, the capsules mixed and applied to the threaded members as discussed hereafter. During the assembly operation, capsules of both components will be broken and the liquid will mix by normal diffusion and primarily because of the continuation of the assembly operation. Chemical reaction will take place at that point and the adhesive will harden in the intended manner.

Other similar types of adhesives which can be used in this fashion are the two-part urea-formaldehyde adhesives, and two-part urethane adhesives. Another suitable adhesive material is a two-part system wherein one part is an encapsulated reactive vinyl monomer, such as an unsaturated polyester, and the other component an encapsulated polymerization initiator, such as an organic peroxide.

The preferred adhesive system for use herein, however, is a one-part anaerobic adhesive. In contrast to the above two-part systems which rely upon mixing for chemical activation, the anaerobic system is a single-part system, a mixture of a monomer and a polymerization initiator. The system does not cure since its unique cure mechanism is chemically inhibited by the presence of oxygen. It has been found that these adhesives can be encapsulated and in such state will receive adequate oxygen through the capsule wall to remain in the unpolymerized liquid form. Since cure is initiated by the removal of the composition from oxygen, release of the liquid between the mating threads of a nut and bolt or a pipe and pipe fitting, for example, will remove the anaerobic composition from contact with atmospheric oxygen and cure will be commenced in a short period of time.

Typical patents disclosing anaerobic compositions are U.S. Pat. No. 2,895,950 to Krieble, issued July 21, 1959, and U.S. Pat. No. 3,218,305 to Krieble, issued Nov. 16, 1965. The previously mentioned U.S. Pat. No. 3,435,012 patent also discloses anaerobic compositions and their use in microencapsulated form on threaded fasteners.

Stated simply, the most common anaerobic composition is a mixture of a polymerizable acrylate ester monomer and an organic hydroperoxide initiator therefor. The initiator generally comprises from about 0.5 to about 10 percent by weight of the monomer. Other additives, such as polymerization accelerators, polymerization inhibitors, thickeners, thixotropic agents, dyes, etc., can be added and the full range of such compositions are intended to fall within the broad scope of this invention.

For the adhesive to be usable in the vast majority of the applications for the threaded fastening members of the invention disclosed herein, the liquid adhesive in its mixed form should be a liquid or an easily flowable paste and preferably a liquid with a viscosity up to about 30,000 centipoise. A more preferred range is from about 10 to about 10,000 centipoise, and the most preferred between about 10 and about 5,000 centipoise. Within the above preferred ranges the adhesive will more readily flow to fill the spaces between the mating threaded members and form a more suitable bond or seal.

To bring the torque-tension relationship of the coated threaded fastening member into approximate equality with the torque-tension relationship of the uncoated threaded fastening member, a torque-tension control agent is utilized as part of the coating. The torque-tension relationship of the coated member should not be more than about 20 percent less than that for the uncoated member; preferably, the relationships do not differ by more than 20 percent in either direction.

While the torque-tension control agent could be applied as a separate coating over the adhesive, this frequently will interfere with the formation of the adhesive or sealant bond between the mating surfaces. Consequently, it is highly preferred for the torque-tension control agent to be admixed with the microencapsulated adhesive and the two applied as a single coating. A preferred coating technique will be discussed in greater detail hereafter.

As torque-tension control agent, any substance having lubricating properties between metal surfaces can be utilized. Since in the majority of threaded fastening members, metal surfaces are involved, the torque-tension control agent may be defined as a substance which in thin film produces a significant decrease in frictional forces between clean, smooth carbon steel surfaces. Preferably, this decrease is at least about 25 percent, and most preferably at least about 50 percent. To reduce the possibility of loss from coating, it is preferred for the torque-tension control agent to be a solid or pastelike substance. However, liquids frequently are usable. If a liquid is used, it may be desirable to encapsulate it in the same general manner as discussed above for the adhesive.

Typical examples of suitable torque-tension control agents are as follows:

1. Oily or waxy organic compounds having known lubricating properties, preferably such compounds having melting points above about 100°F. Typical examples of suitable materials are waxy organic acids, alcohols, esters, amides, etc. having at least about 8 carbon atoms, and preferably between about 10 and about 20 carbon atoms. Specific examples are metal soaps of carboxylic acids, such as potassium or calcium stearate, and copper oleate. Another class is the hydrocarbon oils and waxes, having between about 10 and about 40 carbon atoms, such as petrolatum and paraffin. Natural or modified vegetable oils and waxes also may be used. Most preferably, the melting point of these waxy organic solids is at least about 125° F.

2. Powdered carbon in its amorphous or graphite forms. The most common examples of these substances are graphite powder and lampblack.

3. Soft metallic flake, or powder. Typical examples are powdered or flaked aluminum or copper. These materials are highly preferred because of the surprisingly high "visibility" benefits (color and reflectance) which additionally are provided, even in low concentration within the coating.

4. Powdered or flaked thermoplastic polymers. Typical examples of suitable materials are powdered hydrocarbon and halogenated hydrocarbon polymers, such as polyethylene and polytetrafluoroethylene. Other suitable thermoplastics are polyethers such as polyethyleneoxide and polypropyleneoxide; polyesters; polyamides; and polyurethanes.

5. Finely divided inorganic powders. Typical examples of materials in this class are molybdenum disulfide, boron nitride, and colloidal mica.

Of the above compositions, those listed under Items 1 through 4, inclusive, are the preferred materials. The torque-tension control agents enumerated above may suggest other suitable materials to the reasonably skilled worker in the art.

Any coating process which provides the threaded fastening member with a coating of the microcapsules of adhesive and torque-tension control agent may be used to produce the products of the invention disclosed herein. It has been found particularly desirable to utilize a process which involves the preparation of a solvent-based liquid or pastelike slurry of the above two ingredients, in combination with a solvent soluble binding agent which will serve to form a unified coating on the threaded fastening member after evaporation of the solvent. The most desirable binding agents have been found to be solvent soluble natural or synthetic film-forming polymers. Such substances tend to form durable coatings which bind the adhesive and torque-tension control agent into the coating, and yet are not so hard or abrasive as to present major problems in the assembly operation involving the threaded member.

The specific binding agent chosen will depend upon the solvent which is utilized. It is highly preferred to use a water-based slurry for reasons of convenience, ease of handling and clean-up, and in order to avoid the use of potentially noxious or hazardous solvents. Typical water-soluble binding agents are polyvinylalcohol, styrene-maleic anhydride copolymers, and animal or vegetable glues or gums such as gelatin or mucilage.

Organic solvents also can be used, typical examples of which are the chlorinated solvents such as trichloroethylene, trichloroethane, and methylenechloride; chlorinated/fluorinated hydrocarbon solvents such as monofluorotrichloroethylene and dichlorodifluoroethylene; hydrocarbon solvents such as hexane and pentane; alcohols such as ethanol and isopropanol; and lacquer solvents such as toluene, methylethylketone and benzene. Typical examples of binding agents which are soluble in one or more of the above organic solvents are varnish- or tar-based resins, and thermoplastic polymers such as the following: cellulose acetate buryrate resins; polyvinyl acetate; polyesters of diols and dibasic acids; polyvinylchloride; polyvinyl butyral or formal; epoxides; polyamides; and hydrocarbon resins such as polyterpenes.

The typical weight percent of binding agent used in the slurry will vary with the type of system employed, the type of binding agent employed, and the content of adhesive microcapsules and torque-tension control agent in the slurry. A typical general range, however, will be from about 0.3 percent to about 25 percent by weight of the solvent employed. Similarly, the weight percent of adhesive microcapsules will vary with the system employed, but should be calculated so as to provide sufficient adhesive when applied to the threaded fastening member to provide definite adhesive properties during use. Preferably, the adhesive and other additives will substantially fill the thread roots after evaporation of the solvent. A typical use range for the encapsulated adhesive in the preparation of the slurry will be from about 20 percent to about 100 percent by weight of the solvent.

The amount of torque-tension control agent utilized naturally will depend upon the specific agent and the remainder of the system involved, but should be in such amount as to satisfy the requirements of returning the torque-tension relationship to a minimum of 80 percent of the relationship for the uncoated fastening member. A typical general range of use for the torque-tension control agents described above will be from about 0.1 percent to about 20 percent by weight of the solvent.

A minimum of routine testing by the reasonably skilled worker in the art will easily permit preparation of the balance of ingredients necessary to prepare the products of the invention disclosed herein. Additional ingredients may be added to the slurry if desired, such as dyes, fluorescers, etc. Likewise, pre-coating and/or post-coating treatment of the threaded member may be utilized in order to provide additional features. For example, a top coating may be desirable for appearance or protective reasons.

The slurry can be applied to the bolts by any of a large number of conventional techniques including automatic coating equipment, by dipping the threaded member into the slurry, or by brushing the slurry onto the threads of the threaded member. The amount of slurry applied to the fasteners or other threaded members is primarily a question of choice, provided there is sufficient adhesive and torque-tension control agent on the fastener to achieve the above-described objectives.

The coated threaded members described above have been found to be excellent sealing or locking devices. They can easily be assembled with little applied torque, but quickly form durable assemblies as the adhesive hardens. Another additional and surprising benefit has been the "reuse" feature, i.e., disassembled members can be reassembled and a locking or sealing force will be reestablished. This "reuse" has been found to be present through several (e.g., five) operations.

EXAMPLES

The following examples are given to demonstrate compositions and processes within the scope of the invention disclosed herein. The examples are not intended to be limitations upon the claims. Unless specifically stated to the contrary, all weights and ratios are presented on a weight basis. The numerical results are the average of a plurality of tests, and in most cases are the average of three.

As a standard threaded member for use in the tests of the following examples, ⅜–16 UNF Grade 5 nuts and bolts were selected. The bolts were standard steel, with a standard phosphate and oil coating. As a standard adhesive, microencapsulated anaerobic compositions were used. The standard composition was approximately as follows:

| | |
|---|---|
| Polyethyleneglycol dimethacrylate | 96.3% |
| Cumene Hydroperoxide | 3.0 |
| Dimethylparatoluidine | 0.3 |
| Benzoic sulfimide | 0.4 |
| Quinone | 100 parts per million by weight |

Encapsulation was by the general method disclosed in U.S. Pat. No. 2,800,457 to Green et al., issued July 23, 1957. This process involves the dispersion of minute droplets of the anaerobic composition in water by means of vigorous agitation. Water soluble gelatin is added to the water phase, and then forced to coascervate around the surface of the droplets of the anaerobic composition by the addition of an acidic substance. The result is the production of minute droplets of anaerobic composition encapsulated within a thin gelatin shell. After allowing the gelatin walls to harden to handling strength, the capsules are removed from the aqueous system, washed and dried and are thereafter ready for addition to the coating slurries described in the Examples hereafter.

EXAMPLE I

Six percent by weight polyvinylalcohol binding agent was dissolved in water along with one percent by weight Xanthan gum thickener. To 100 parts by weight of this aqueous mixture were added 50 parts by weight of the standard microencapsulated anaerobic adhesive described above to form a coating slurry. A portion of this slurry was then coated onto the standard bolts described above, substantially filling the thread roots of the entire threaded portion of the bolt. The water was then allowed to evaporate, leaving a durable coating of microencapsulated anaerobic adhesive on the threaded area of the standard bolt.

To another portion of the slurry was added one percent by weight of polytetrafluoroethylene ("Teflon") powder. This polytetrafluoroethylene-containing slurry then was used to coat another series of bolts, substantially as described in the preceding paragraph. Another portion of the slurry was similarly modified by the addition of 1.0% by weight of extremely fine aluminum powder and 1.0% by weight of finely powdered graphite. This modified slurry was also used to coat a series of standard bolts, substantially as described in the preceding paragraph.

The torque-tension relationships of the coated bolts then were determined using the Industrial Fastener Institute Test of Specification 101, Section 3, which involves the use of a standard Skidmore-Wilhelm torque-tension apparatus. Tension in the bolt was measured at each of 10, 20, 30 and 40 ft.lbs. of torque. The results are tabulated below:

Table I

| | Tension in Bolts (psi) | | | |
|---|---|---|---|---|
| Applied Torque (Ft-LB) | Standard Bolts (Uncoated) | Adhesive Coated Bolts | Adhesive/ "Teflon" Coated Bolts | Adhesive/ Aluminum/ Graphite Coated Bolts |
| 10 | 1500 | 1200 | 1500 | 1400 |
| 20 | 3400 | 2700 | 3400 | 3400 |
| 30 | 5000 | 3600 | 5400 | 5200 |
| 40 | 7000 | 5200 | 7500 | 7500 |

EXAMPLE II

A different batch of ⅜–16 Grade 5 bolts were used in another test using the above standard Industrial Fastener Institute Test. In this test, tension was measured at 40 ft.lbs., a common torque value for bolts of this type and hence a significant point at which to measure the torque tension relationship. The "as received" bolts produced a tension of 8,100 psi at 40 ft.lb. torque. A series of these bolts was coated with the standard microencapsulated adhesive slurry described above in Example I, to which no torque-tension control agent had been added.

Various portions of this slurry were modified by the addition of various torque-tension control agents, and each was used to coat standard bolts as described above in Example I. The bolts were allowed to stand overnight to allow the water to evaporate to form a firm coating on the threaded area of the bolts. Each series of bolts then was tested at 40 ft.lbs. torque to determine the tension produced in the bolt. The results are tabulated below by reference to the type and amount (as percent by weight) added to the slurry prior to the coating operation. (All bolts were treated prior to testing with a standard rust inhibiting coating of 5 percent light-weight oil in hexane).

Table II

| Sample | Torque Tension Control Agent | Tension at 40 Ft-Lb. Torque |
|---|---|---|
| 1 | None — "As Received" Bolt | 8100 |
| 2 | None — Adhesive Coating Only | 5700 |
| 3 | 1% Graphite | 8200 |
| 4 | 3% Graphite | 9000 |
| 5 | 1% "Teflon" | 8200 |

Table II-Continued

| Sample | Torque Tension Control Agent | Tension at 40 Ft-Lb. Torque |
|---|---|---|
| 6 | 1% Molybdenum disulfide | 6500 |
| 7 | 1% Potassium Stearate | 8000 |
| 8 | 2% Potassium Stearate | 8500 |
| 9 | 1% Aluminum, 1% "Carbowax" * | 8000 |
| 10 | 3% Ammonium Salt of Styrene-Maleic Anhydride Polymer ** | 8000 |

\* Polyoxyethylene of Average Molecular Weight 20,000
\*\* With Sample 10, slurry contained 3% Polyvinylalcohol rather than 6%

EXAMPLE III

A third batch of standard ⅜–16 Grade 5 steel bolts was used in another test similar to that described in Examples I and II, above. In this test one series of bolts was used in "as received" condition. Another series of bolts were coated as described in Example I with the standard microencapsulated anaerobic adhesive slurry, which also contained one percent by weight finely powdered aluminum and 0.6 percent by weight of the "Carbowax" of Sample 9, Example II. A third series of bolts was coated with the same standard slurry, which also contained one percent by weight finely powdered aluminum and 0.3 percent by weight of finely powdered graphite. The above-described Industrial Fastener Institute Test was then used to determine the torque-tension relationship at 10, 20, 30 and 40 ft.lbs. of applied torque. The results are presented below in Table III.

Table III

| Applied Torque (Ft-Lb) | Uncoated Bolts | Tension in Bolts (psi) Adhesive/Aluminum/ "Carbowax" Coated Bolts | Adhesive/Aluminum/ Graphite Coated Bolts |
|---|---|---|---|
| 10 | 1450 | 1250 | 1650 |
| 20 | 3800 | 3200 | 4100 |
| 30 | 5650 | 5100 | 6100 |
| 40 | 8000 | 7100 | 8250 |

To demonstrate the utility of the coated bolts of this invention in typical applications, samples of each series of coated bolts of this example were inserted in the through-drilled holes of a test block, and assembled with mating nuts. It was found that the mating nuts could be assembled onto the coated portion of the threaded bolts by hand without the use of a wrench or other tool. The nuts then were tightened against the test block with a torque wrench. For each series, a portion of the bolts were pretorqued to 120 in.lbs., another portion to 240 in.lbs. and a third portion to 360 in.lbs. All of the samples were allowed to remain at room temperature for 24 hours, after which time the "break loose" and "prevailing" torques were measured. Break loose torque is the amount of torque applied to the nut to produce the first relative motion between the nut and bolt, and the prevailing torque is the average torque required to produce one revolution of the nut relative to the bolt. The results are presented below in Table IV, and demonstrate the ability of the threaded fastening members of this invention to produce desirable locking forces in threaded assemblies.

Table IV

| Pretorque (In-Lb) | Adhesive/Aluminum/ "Carbowax" Bolts | | Adhesive/Aluminum/ Graphite Bolts | |
|---|---|---|---|---|
| | Breakloose Torque (In-Lb) | Prevailing Torque (In-Lb) | Breakloose Torque (In-Lb) | Prevailing Torque (In-Lb) |
| 120 | 130 | 20 | 150 | 45 |
| 240 | 195 | 25 | 225 | 45 |
| 360 | 255 | 20 | 270 | 45 |

We claim:

1. A threaded fastening member having a sealing or bonding coating on at least a portion of the threaded area thereof, said coating comprising a microencapsulated adhesive and as a torque-tension control agent a substance having lubricating properties between metal surfaces, said substance selected from the group consisting of oily or waxy organic compounds, powdered carbon, soft metallic flake or powder, powdered or flaked thermoplastic polymers, and finely divided inorganic powders, the torque-tension relationship of the fastening member so coated being no more than about 20 percent lower than the torque-tension relationship of the uncoated fastening member.

2. The fastening member of claim 1 wherein the adhesive is an anaerobic adhesive.

3. The fastening member of claim 2 wherein the anaerobic adhesive comprises a polymerizable acrylate ester monomer and from 0.5 percent to about 10 percent by weight of a hydroperoxide polymerization initiator.

4. The fastening member of claim 1 wherein the microencapsulated adhesive has an average particle size between about 25 and about 750 microns.

5. The fastening member of claim 4 wherein the adhesive is a liquid adhesive having a viscosity between about 10 and about 10,000 centipoise.

6. The fastening member of claim 1 wherein the torque-tension control agent is capable of reducing the frictional forces between steel surfaces by at least about 25 percent.

7. The fastening member of claim 1 wherein the torque-tension relationship of the coated fastening member does not differ by more than about 20 percent from the torque-tension relationship of the uncoated fastening member.

8. A threaded fastening element at least a portion of the thread roots of which are substantially filled with a coating comprising a microencapsulated adhesive and as a torque-tension control agent a substance having lubricating properties between metal surfaces, said substance selected from the group consisting of oily or waxy organic compounds, powdered carbon, soft metallic flake or powder, powdered or flaked thermoplastic polymers, and finely divided inorganic powders, the torque-tension relationship of said fastening element with said coating being no more than 20 percent lower than the torque-tension relationship of said fastening element without said coating.

9. The fastening element of claim 8 wherein the microencapsulated adhesive has an average particle size between about 25 and about 750 microns.

10. The fastening element of claim 9 wherein the adhesive is an anaerobic adhesive comprising a polymerizable acrylate ester monomer and from about 0.5 percent to about 10 percent by weight of an organic hydroperoxide polymerization initiator.

11. The process for producing improved threaded fastening members which comprises preparing a solvent slurry of a solvent-soluble binding agent, an encapsulated liquid adhesive contained within a solvent-insoluble encapsulating shell, and as a torque-tension control agent a substance having lubricating properties between metal surfaces, said substance selected from the group consisting of oily or waxy organic compounds, powdered carbon, soft metallic flake or powder, powdered or flaked thermoplastic polymers, and finely divided inorganic powders; applying said slurry to at least a portion of the threaded area of a threaded fastening member; and allowing the solvent to evaporate to form a coated threaded fastening member having an adhesive coating, but with a torque-tension relationship which is not more than about 20 percent less than the torque-tension relationship of the uncoated threaded fastening member.

12. The process of claim 11 wherein the solvent is water, and the binding agent is a film-forming thermoplastic polymer.

13. The process of claim 12 wherein the binding agent is polyvinyl alcohol.

14. The process of claim 13 wherein the encapsulated adhesive has an average particle size between about 25 and about 750 microns, and the liquid adhesive is an anaerobic adhesive comprising a polymerizable acrylate ester monomer and a hydroperoxide polymerization initiator.

* * * * *